(12) United States Patent
Liu et al.

(10) Patent No.: US 11,222,215 B1
(45) Date of Patent: Jan. 11, 2022

(54) IDENTIFYING A SPECIFIC OBJECT IN A TWO-DIMENSIONAL IMAGE OF OBJECTS

(71) Applicant: Toyota Motor Engineering & Manufacturing North America, Inc., Plano, TX (US)

(72) Inventors: Yongkang Liu, Plano, TX (US); Ziran Wang, San Jose, CA (US); Kyungtae Han, Palo Alto, CA (US); Zhenyu Shou, Sunnyvale, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/927,467

(22) Filed: Jul. 13, 2020

(51) Int. Cl.
*H04N 7/18* (2006.01)
*G06K 9/00* (2006.01)
(Continued)

(52) U.S. Cl.
CPC .......... *G06K 9/00791* (2013.01); *B60K 37/02* (2013.01); *G01S 19/01* (2013.01);
(Continued)

(58) Field of Classification Search
CPC .......... H04N 7/18; H04N 5/247; H04N 5/445; G01S 19/01; B60K 37/02;
(Continued)

(56) References Cited

U.S. PATENT DOCUMENTS 7,764,808 B2 * 7/2010 Zhu .................... G06K 9/3241
382/104
8,878,927 B2 * 11/2014 Richardson ............ G08G 1/164
348/135

(Continued)

OTHER PUBLICATIONS

Maheswaran et al., "A Fog Computing Framework for Autonomous Driving Assist: Architecture, Experiments, and Challenges," Jul. 16, 2019, pp. 1-10, found at arXiv:1907.09454v1 [eess.SP].

(Continued)

*Primary Examiner* — Trang U Tran
(74) *Attorney, Agent, or Firm* — Christopher G. Darrow; Darrow Mustafa PC

(57) ABSTRACT

An object detection system can identify a specific object in a two-dimensional image. A processor can receive the two-dimensional image with bounding boxes around objects. The processor can cause a point to appear in the two-dimensional image. The point can represent a position, in three-dimensional space, of the specific object. The processor can determine an existence of a condition. The condition can be that the point is enclosed by a plurality of bounding boxes. The processor can receive, in response to the existence of the condition, a depth image. The processor can determine, in response to the existence of the condition and based on information included in the depth image and a location of the point in the two-dimensional image, a specific bounding box that encloses the point. The processor can cause, based on a location of the specific bounding box, an indication of the specific object to be presented.

20 Claims, 12 Drawing Sheets

(51) Int. Cl.
| | |
|---|---|
| *G06T 7/50* | (2017.01) |
| *G06K 9/62* | (2006.01) |
| *G06T 7/73* | (2017.01) |
| *H04N 5/247* | (2006.01) |
| *H04N 5/445* | (2011.01) |
| *G01S 19/01* | (2010.01) |
| *B60K 37/02* | (2006.01) |

(52) U.S. Cl.
CPC .............. *G06K 9/6261* (2013.01); *G06T 7/50* (2017.01); *G06T 7/73* (2017.01); *H04N 5/247* (2013.01); *H04N 5/445* (2013.01); *B60K 2370/157* (2019.05); *B60K 2370/1529* (2019.05); *B60K 2370/21* (2019.05); *G06T 2207/10012* (2013.01); *G06T 2207/30252* (2013.01)

(58) Field of Classification Search
CPC ...... B60K 2370/1529; B60K 2370/157; B60K 2370/21; G06K 9/00791; G06K 9/6261; G06T 7/50; G06T 7/73; G06T 2207/10012; G06T 2207/30252
USPC .......................................... 348/135, 143, 144
See application file for complete search history.

(56) References Cited

U.S. PATENT DOCUMENTS

| | | | |
|---|---|---|---|
| 8,970,451 | B2 | 3/2015 | Nagasawa et al. |
| 8,976,040 | B2 * | 3/2015 | Ray Avalani ......... B60W 30/08 340/903 |
| 9,255,811 | B2 | 2/2016 | Edelen |
| 9,267,808 | B2 | 2/2016 | Nagasawa et al. |
| 9,465,997 | B2 * | 10/2016 | Tu ........................... G06T 7/254 |
| 10,081,308 | B2 * | 9/2018 | Kuehnle ............ G06K 9/00791 |
| 10,275,669 | B2 * | 4/2019 | Uliyar ..................... G06T 7/254 |
| 10,564,993 | B2 | 2/2020 | Deutsch et al. |
| 10,929,986 | B2 * | 2/2021 | Wang ................. G06K 9/00805 |
| 11,024,055 | B2 * | 6/2021 | Hsu .......................... G01S 17/42 |

OTHER PUBLICATIONS

Dangra et al., "User Profiling of Automobile Driver and Outlier Detection," International Journal of Innovative Research & Development, Nov. 2014, pp. 49-55, vol. 3, issue 12.

Yuan et al., "Estimation of Vehicle Pose and Position with Monocular Camera at Urban Road Intersections," Journal of Computer Science and Technology 32, Nov. 2017, pp. 1150-1161, Pub. Springer-Verlag.

Wang et al., "An Improved Vehicle Tracking Method Based on MDNet," Jan. 10, 2020, pp. 1-8, EasyChair Preprint No. 2360.

Pillai et al., "Monocular SLAM Supported Object Recognition," Jun. 4, 2015, pp. 1-9, found at arXiv:1506.01732v1 [cs.RO].

Dangra et al., "Automotive User Profiling Using Vehicle Data Considering Different Driving Scenarios," International Journal of Computer Science and Information Technologies (IJCSIT), pp. 7346-7349, vol. 5 (6), 2014.

Lestyan et al., "Extracting vehicle sensor signals from CAN logs for driver re-identification," Oct. 25, 2019, pp. 1-10, found at arXiv:1902.08956v3 [cs.CR].

Xiao et al., "Multimodal End-to-End Autonomous Driving," Jun. 7, 2019, pp. 1-15, found at arXiv:1906.03199v1 [cs.CV].

Krammer et al., "Providentia—A Large Scale Sensing System for the Assistance of Autonomous Vehicles," Jun. 19, 2019, pp. 1-5, found at arXiv:1906.06789v3 [cs.RO].

Hinz et al., "Providentia," Proceedings of the 5th GI/ITG KuVS Fachgespräch Inter-Vehicle Communication (FG-IVC 2017,) Apr. 2017, pp. 41-42.

Alam et al., "C2PS: A Digital Twin Architecture Reference Model for the Cloud-Based Cyber-Physical Systems," IEEE Access, Mar. 13, 2017, pp. 2050-2062, vol. 5.

Lee et al., "Leveraging Pre-Trained 3D Object Detection Models for Fast Ground Truth Generation," Jul. 16, 2018, pp. 1-7, 21st International Conference on Intelligent Transportation Systems (ITSC).

Luo et al., "3D-SSD: Learning Hierarchical Features from RGB-D Images for Amodal 3D Object Detection," Feb. 21, 2018, pp. 1-9, found at arXiv:1711.00238v2 [cs.CV].

* cited by examiner

IDENTIFYING A SPECIFIC OBJECT IN A TWO-DIMENSIONAL IMAGE OF OBJECTS

TECHNICAL FIELD

The disclosed technologies are directed to advanced driver-assistance systems (ADAS) that include an object detection system and in which a vehicle that includes the ADAS can include "connected car" technology and "digital twin" technology.

BACKGROUND

Advanced driver-assistance systems (ADAS) can be used to enhance an operation of a vehicle in order to reduce a likelihood of a collision. Such systems can include, for example, an electronic stability control system, an anti-lock brakes system, a lane departure warning system, an adaptive cruise control system, a traction control system, or the like. More recently, ADAS can include an object detection system in which a camera system disposed on the vehicle can record images of objects outside of the vehicle and a display system disposed in the vehicle can present the images.

SUMMARY

In an embodiment, a system for identifying a specific object in a two-dimensional image of objects can include one or more processors, a data store, and a memory. The one or more processors can be disposed in a vehicle. The data store can be communicably coupled to the one or more processors. The data store can store the two-dimensional image and a depth image. The memory can be communicably coupled to the one or more processors. The memory can store a communications module, an image processing module, and an identification module. The communications module can include instructions that when executed by the one or more processors cause the one or more processors to receive the two-dimensional image with bounding boxes around the objects. The communications module can include instructions that when executed by the one or more processors cause the one or more processors to receive, in response to an existence of a condition, the depth image. The condition can be that a point is enclosed by a plurality of the bounding boxes. The point can represent a position, in a three-dimensional space, of the specific object. The communications module can include instructions that when executed by the one or more processors cause the one or more processors to cause, based on a location of a specific bounding box that encloses the point, an indication of the specific object to be presented. The image processing module can include instructions that when executed by the one or more processors cause the one or more processors to cause the point to appear in the two-dimensional image. The identification module can include instructions that when executed by the one or more processors cause the one or more processors to determine, in response to the existence of the condition and based on information included in the depth image and a location of the point in the two-dimensional image, the specific bounding box that encloses the point.

In another embodiment, a method for identifying a specific object in a two-dimensional image of objects can include receiving, by a processor disposed in a vehicle, the two-dimensional image with bounding boxes around the objects. The method can include causing, by the processor, a point to appear in the two-dimensional image. The point can represent a position, in a three-dimensional space, of the specific object. The method can include determining, by the processor, an existence of a condition. The condition can be that the point is enclosed by a plurality of the bounding boxes. The method can include receiving, by the processor and in response to the existence of the condition, a depth image. The method can include determining, by the processor, in response to the existence of the condition, and based on information included in the depth image and a location of the point in the two-dimensional image, a specific bounding box that encloses the point. The method can include causing, by the processor and based on a location of the specific bounding box, an indication of the specific object to be presented.

In another embodiment, a non-transitory computer-readable medium for identifying a specific object in a two-dimensional image of objects can include instructions that when executed by one or more processors cause the one or more processors to receive the two-dimensional image with bounding boxes around the objects. The non-transitory computer-readable medium can include instructions that when executed by one or more processors cause the one or more processors to cause a point to appear in the two-dimensional image. The point can represent a position, in a three-dimensional space, of the specific object. The non-transitory computer-readable medium can include instructions that when executed by one or more processors cause the one or more processors to determine an existence of a condition. The condition can be that the point is enclosed by a plurality of the bounding boxes. The non-transitory computer-readable medium can include instructions that when executed by one or more processors cause the one or more processors to receive, in response to the existence of the condition, a depth image. The non-transitory computer-readable medium can include instructions that when executed by one or more processors cause the one or more processors to determine, in response to the existence of the condition and based on information included in the depth image and a location of the point in the two-dimensional image, a specific bounding box that encloses the point. The non-transitory computer-readable medium can include instructions that when executed by one or more processors cause the one or more processors to cause, based on a location of the specific bounding box, an indication of the specific object to be presented.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
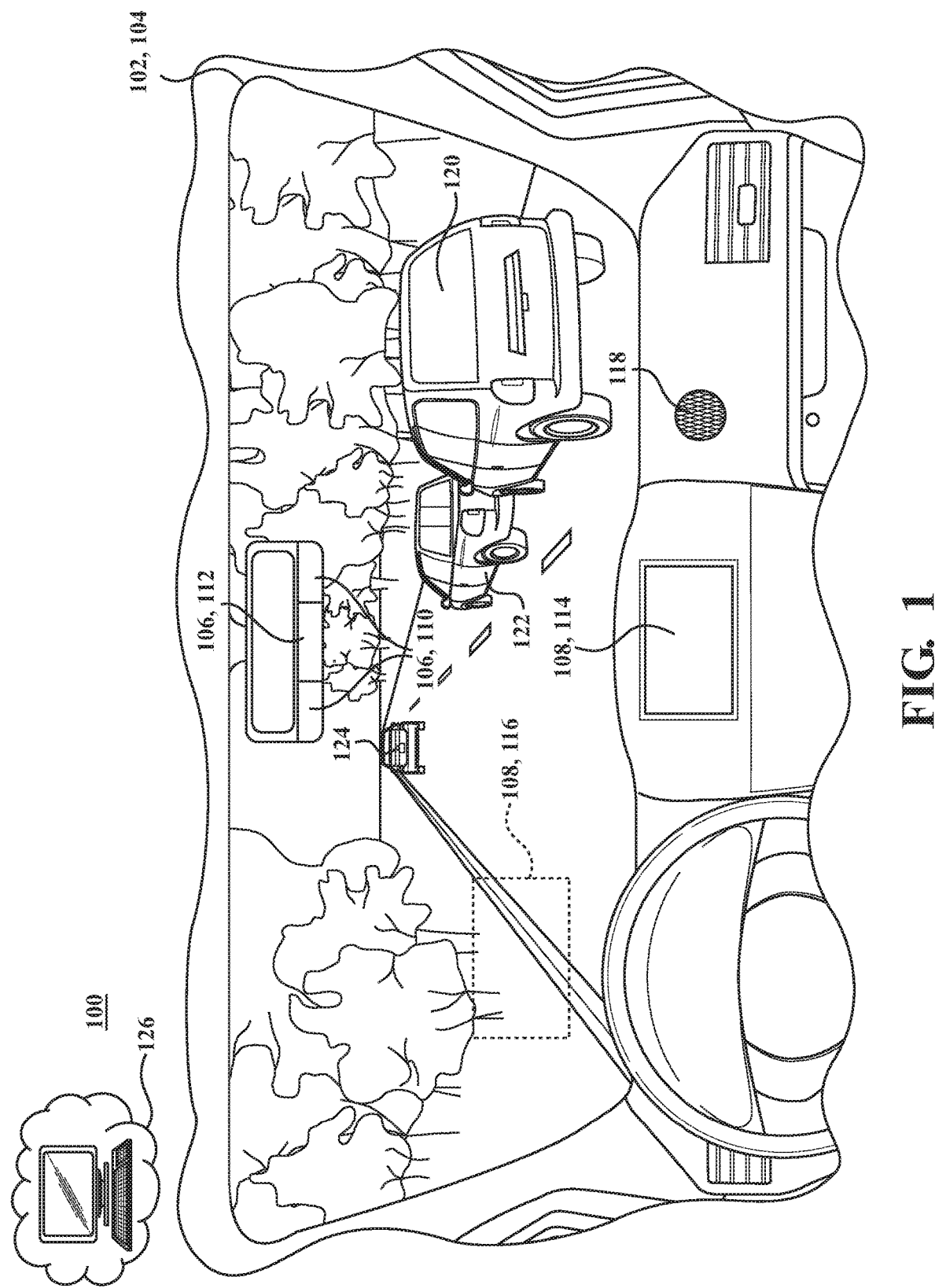
FIG. 1 is a diagram that includes an example of an environment for a vehicle that has advanced driver-assistance systems (ADAS) that include an object detection system.

"Connected car" technology can be used to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), or a pedestrian (e.g., "Vehicle to Pedestrian" (V2P) technology). "Vehicle to Everything" (V2X) technology can integrate aspects of these individual communications technologies. Connected car technology can be used for a variety of applications. Such applications can include, for example, turn-by-turn navigation, vehicle safety, driver assistance, e-commerce, entertainment, Internet of things applications, or the like.

"Digital twin" technology can be used to represent properties and states of an entity. The entity can include one or more sensors configured to detect data related to the properties and the states. The digital twin technology can include a first electronic communications system, disposed on the entity and configured to transmit the data, and a second electronic communications system disposed at a location remote from the entity and configured to receive the data and to store the data as a digital twin. The data can be transmitted, received, and stored in real time. The data can include a position of the entity and information that indicates that the entity is in motion. The entity can be a product. The data can include information about maintenance and repairs performed on the product. The information can be used to manage a life cycle of the product.

The disclosed technologies can be included in a vehicle that has advanced driver-assistance systems (ADAS) that include an object detection system and in which the vehicle can include "connected car" technology and "digital twin" technology. A processor disposed in the vehicle can receive a two-dimensional image with bounding boxes around objects. For example, the objects can be other vehicles. For example, the two-dimensional image can be presented on a dashboard display or a heads-up display. The processor can cause a point to appear in the two-dimensional image. The point can represent a position, in a three-dimensional space, of a specific object. For example, the specific object can be a specific other vehicle. For example, information related to the point can be received from a source separate from the vehicle. For example, the source separate from the vehicle can be a cloud platform (e.g., a connected car cloud platform). For example, the cloud platform can store a digital twin of the specific object. The processor can determine an existence of a condition. The condition can be that the point is enclosed by a plurality of the bounding boxes.

In response to the existence of the condition, the processor can receive a depth image. In response to the existence of the condition and based on information included in the depth image and a location of the point in the two-dimensional image, the processor can determine a specific bounding box that encloses the point. Based on a location of the specific bounding box, the processor can cause an indication of the specific object to be presented. For example, the indication of the specific object can be presented in a manner that distinguishes the specific object from another of the objects. For example, the specific bounding box can be presented in a manner that distinguishes the specific bounding box from another of the bounding boxes. For example, the processor can cause a symbol to appear in the two-dimensional image in a vicinity of the specific object.

Additionally, the processor can receive additional information associated with the specific object from the source separate from the vehicle (e.g., the connected car cloud platform that stores the digital twin of the specific object). The processor can present the additional information. For example, the additional information can be presented visually, audibly, or both. If the specific object is a specific other vehicle, then the additional information can include information about the specific other vehicle, information about an operator of the specific other vehicle, or both.

FIG. 1 is a diagram that includes an example of an environment 100 for a vehicle 102 that has advanced driver-assistance systems (ADAS) that include an object detection system 104. For example, the object detection system 104 can include a camera system 106 and a display system 108. For example, the camera system 106 can include a stereo camera. Alternatively, the camera system 106 can include a first camera 110 and a second camera 112. For example, the first camera 110 can be the stereo camera. For example, the display system 108 can include a dashboard display 114 or a heads-up display 116. Additionally, for example, the vehicle 102 can include a speaker 118. For example, the environment 100 can include a first object 120 (e.g., a first other vehicle), a second object 122 (e.g., a second other vehicle), and a third object 124 (e.g., a third other vehicle). For example, in the environment 100, a portion of the second object 122 (e.g., the second other vehicle) may be occluded, from a viewpoint of the camera system 106, by the first object 120 (e.g., the first other vehicle). Additionally, for example, the environment 100 can include a connected car cloud platform 126 that can exchange communications with the vehicle 102. For example, the connected car cloud platform 126 can include an electronic communications system that implements digital twin technology and is configured to receive data from objects and to store the data as digital twins of the objects.

Figure 2:
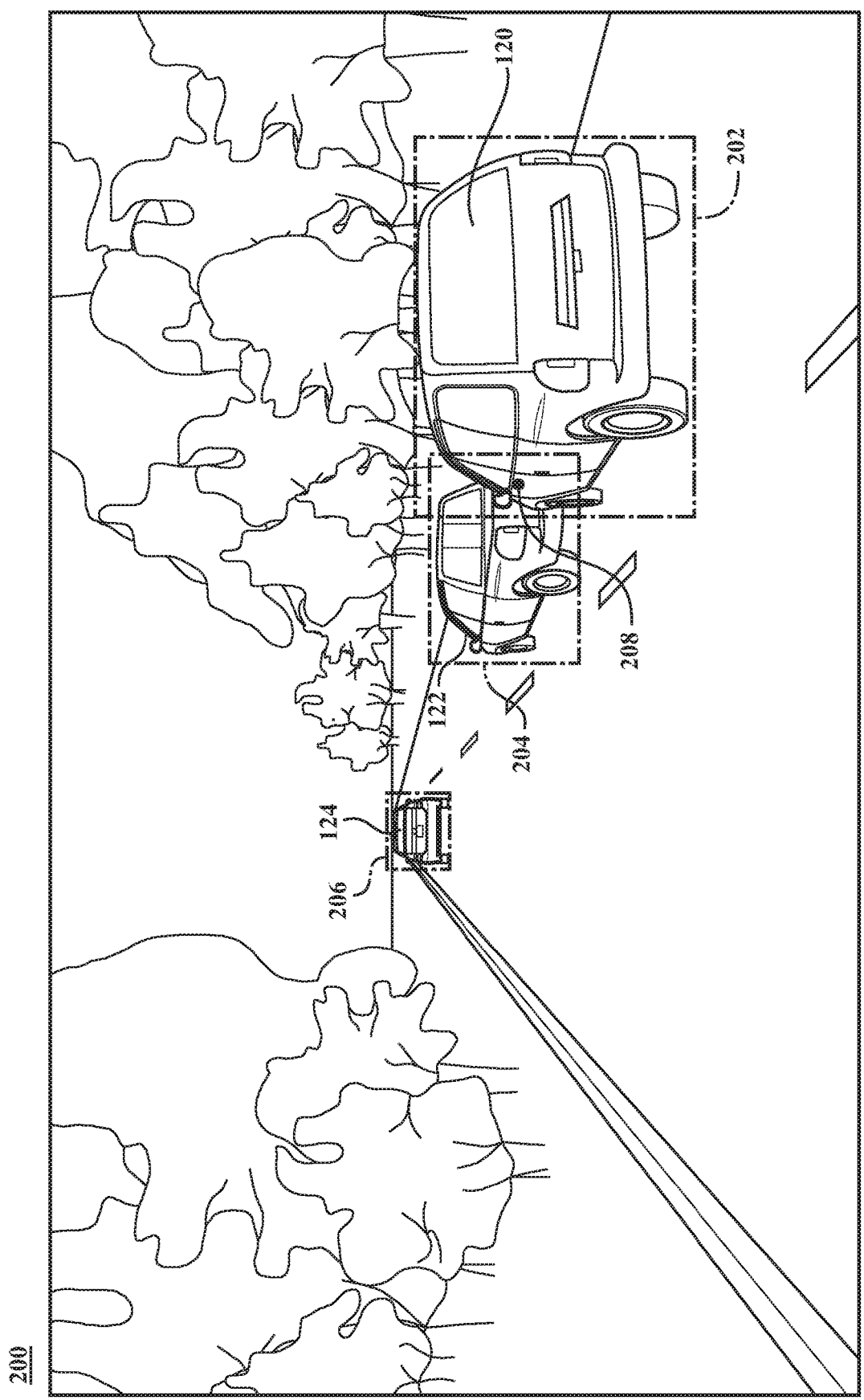
FIG. 2 is a diagram that includes an example of a two-dimensional image of objects, according to the disclosed technologies.

FIG. 2 is a diagram that includes an example of a two-dimensional image 200 of objects, according to the disclosed technologies. The two-dimensional image 200 can include, for example, the first object 120 (e.g., the first other vehicle), the second object 122 (e.g., the second other vehicle), and the third object 124 (e.g., the third other vehicle). The two-dimensional image 200 can include, for example, a first bounding box 202 around the first object 120 (e.g., the first other vehicle), a second bounding box 204 around the second object 122 (e.g., the second other vehicle), and a third bounding box 206 around the third object 124 (e.g., the third other vehicle). A point 208 can be caused to appear in the two-dimensional image 200.

Figure 3:
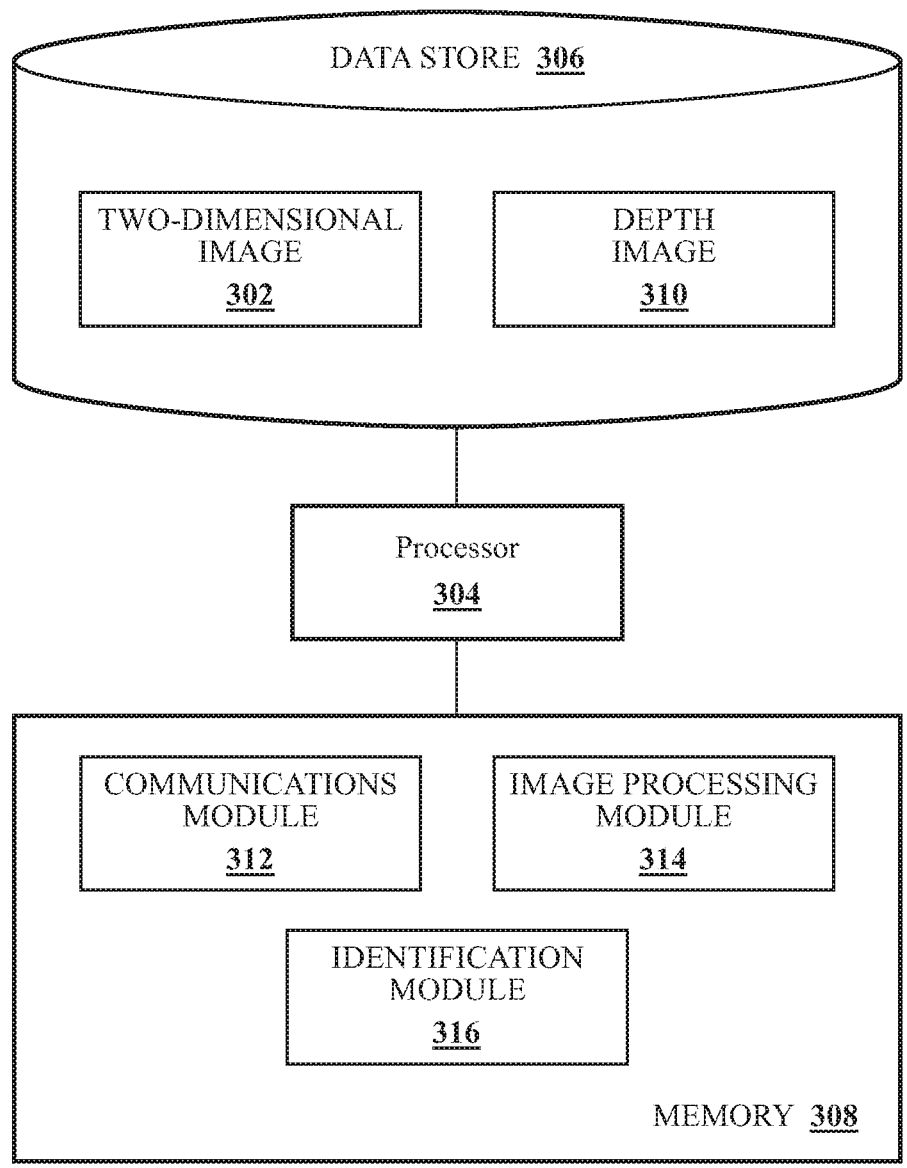
FIG. 3 includes a block diagram that illustrates an example of a system for identifying a specific object in a two-dimensional image of objects, according to the disclosed technologies.

FIG. 3 includes a block diagram that illustrates an example of a system 300 for identifying a specific object in a two-dimensional image 302 of objects, according to the disclosed technologies. The system 300 can include, for example, a processor 304, a data store 306, and a memory 308. The processor 304 can be disposed in a vehicle (e.g., the vehicle 102 illustrated in FIG. 1). The data store 306 can be communicably coupled to the processor 304. The data store 306 can store, for example, the two-dimensional image 302 (e.g., the two-dimensional image 200 illustrated in FIG. 2) and a depth image 310. The memory 308 can be communicably coupled to the processor 304. The memory 308 can store, for example, a communications module 312, an image processing module 314, and an identification module 316.

The communications module 312 can include instructions that function to control the processor 304 to receive the two-dimensional image 302 (e.g., the two-dimensional image 200 illustrated in FIG. 2) with bounding boxes (e.g., the first bounding box 202, the second bounding box 204, and the third bounding box 206 illustrated in FIG. 2) around the objects (e.g., the first object 120, the second object 122, and the third object 124 illustrated in FIGS. 1 and 2). For example, the instructions of the communications module 312 that function to control the processor 304 to receive the two-dimensional image 302 can receive, from a neural network (not illustrated), the two-dimensional image 302 with the bounding boxes around the objects. For example, the neural network can be configured to operate version 3 of a You Only Look Once (YOLO) model implemented in PyTorch (PyTorch YOLOv3). For example, the neural network can have been trained using the Microsoft® Common Objects in Context (COCO) dataset.

The communications module 312 can include instructions that function to control the processor 304 to receive, in response to an existence of a condition, the depth image 310. The condition can be that a point (e.g., the point 208 illustrated in FIG. 2) is enclosed by a plurality of the bounding boxes (e.g., the first bounding box 202 and the second bounding box 204 illustrated in FIG. 2). The point can represent a position, in a three-dimensional space, of the specific object (e.g., the second object 122 (e.g., the second other vehicle) illustrated in FIGS. 1 and 2). For example, the instructions of the communications module 312 that function to control the processor 304 to receive the depth image 310 can receive the depth image 310 from a first camera (e.g., the first camera 110 illustrated in FIG. 1).

Figure 4:
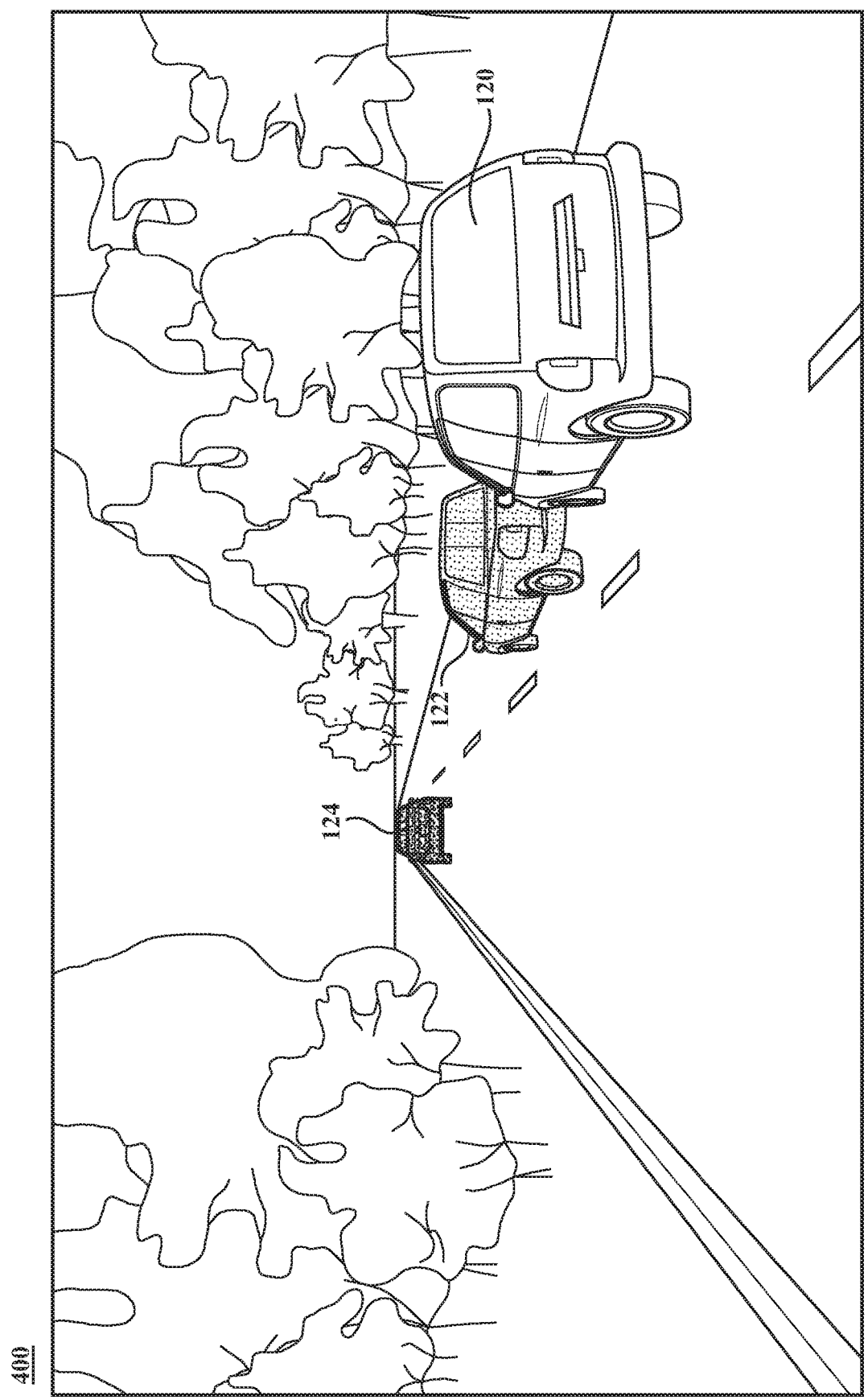
FIG. 4 is a diagram that includes an example of a depth image, according to the disclosed technologies.

FIG. 4 is a diagram that includes an example of a depth image 400, according to the disclosed technologies. The depth image 400 can include, for example, the first object 120 (e.g., the first other vehicle), the second object 122 (e.g., the second other vehicle), and the third object 124 (e.g., the third other vehicle). In the depth image 400, for example, objects at a distance from a camera that produced the depth image (e.g., the first camera 110 illustrated in FIG. 1) of about 100 feet (e.g., the first object 120 (e.g., the first other vehicle) illustrated in FIGS. 1 and 2) can be presented in white, objects at a distance from the camera that produced the depth image of about 200 feet (e.g., the second object 122 (e.g., the second other vehicle) illustrated in FIGS. 1 and 2) can be presented in a shade of gray, and objects at a distance from the camera that produced the depth image of greater than 1,000 feet (e.g., the third object 124 (e.g., the third other vehicle) illustrated in FIGS. 1 and 2) can be presented in black.

Figure 5:
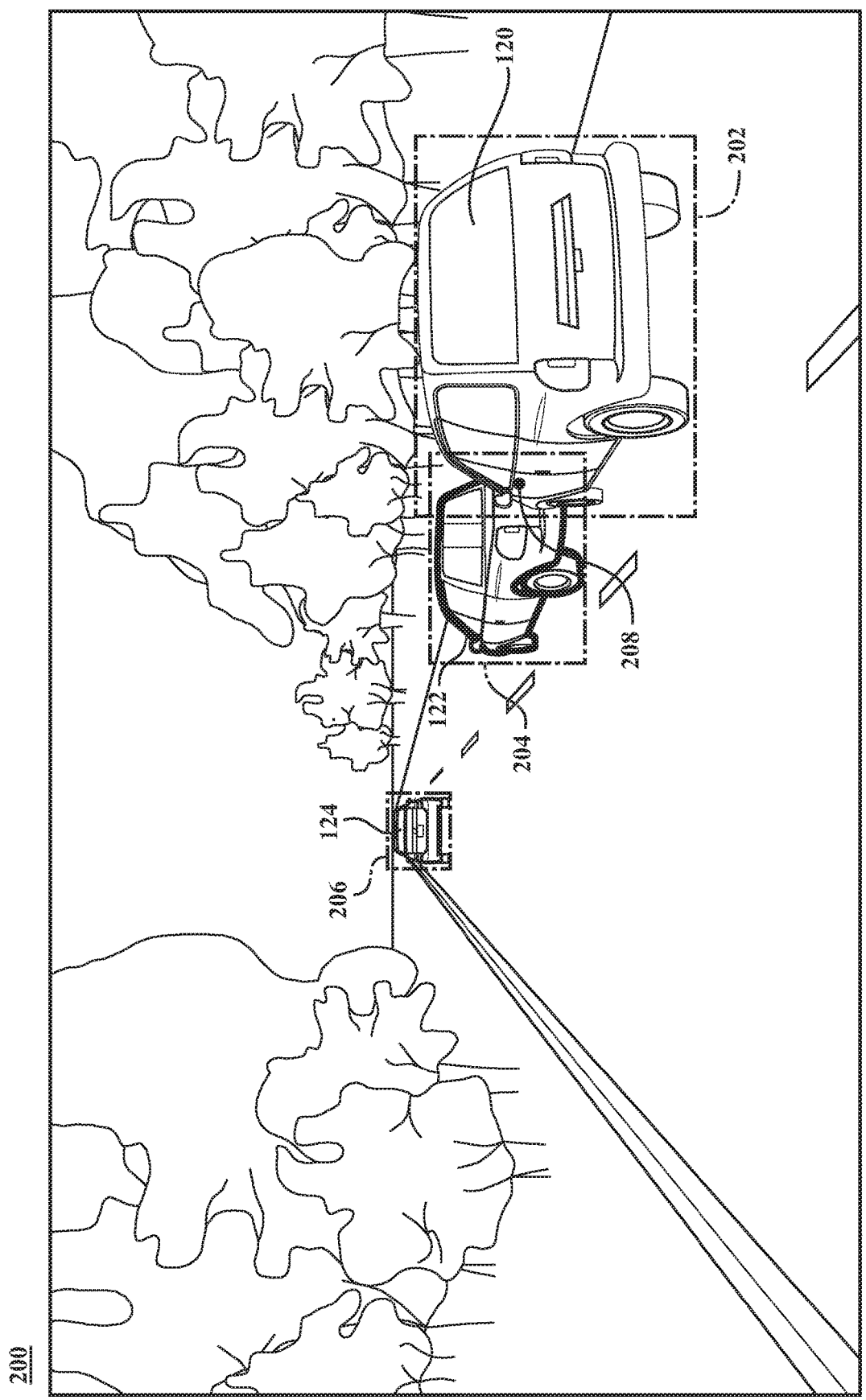
FIG. 5 is a diagram that includes an example of the two-dimensional image of objects in which a specific object is highlighted, according to the disclosed technologies.
Figure 6:
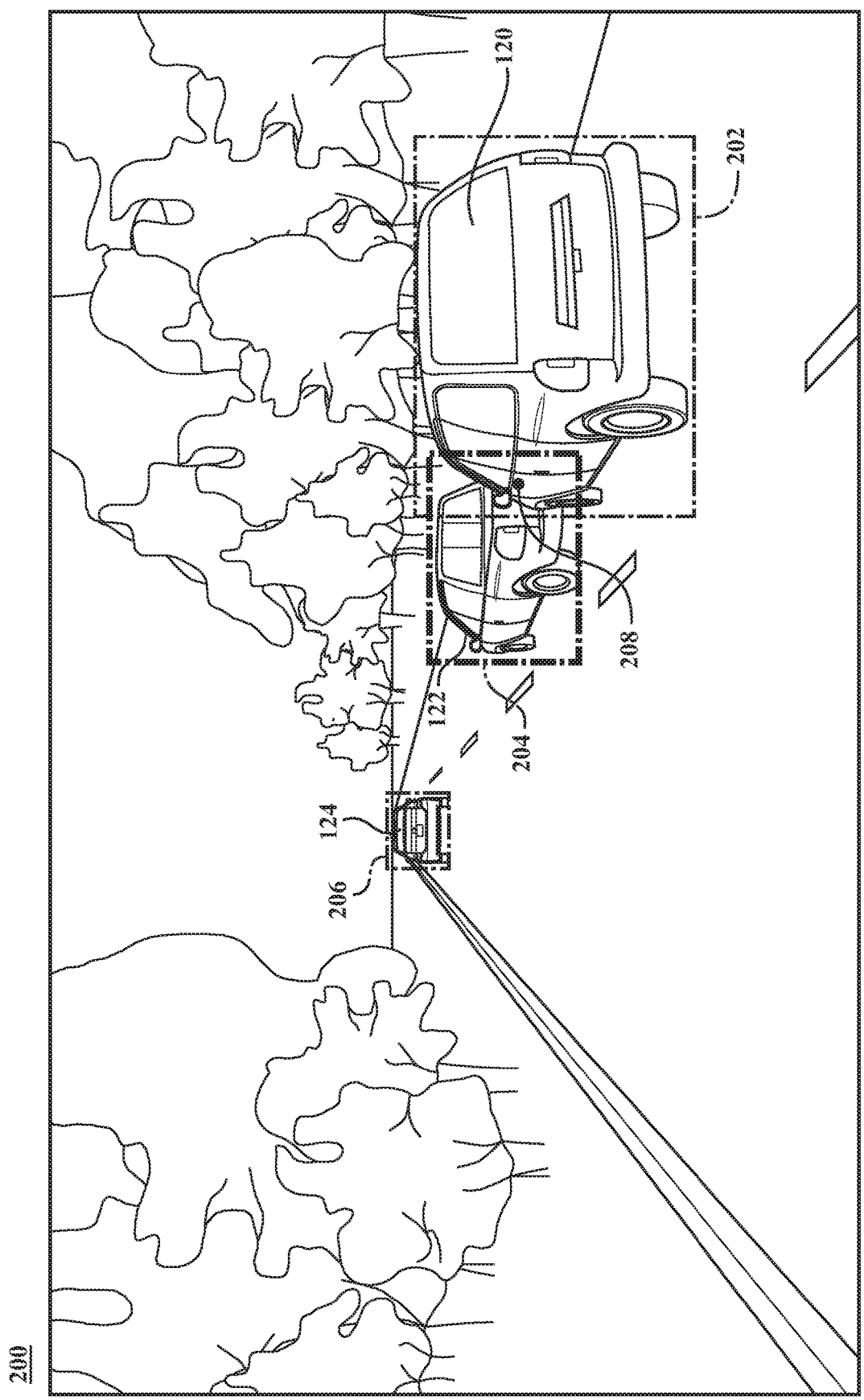
FIG. 6 is a diagram that includes an example of the two-dimensional image of objects in which a specific bounding box is highlighted, according to the disclosed technologies.
Figure 7:
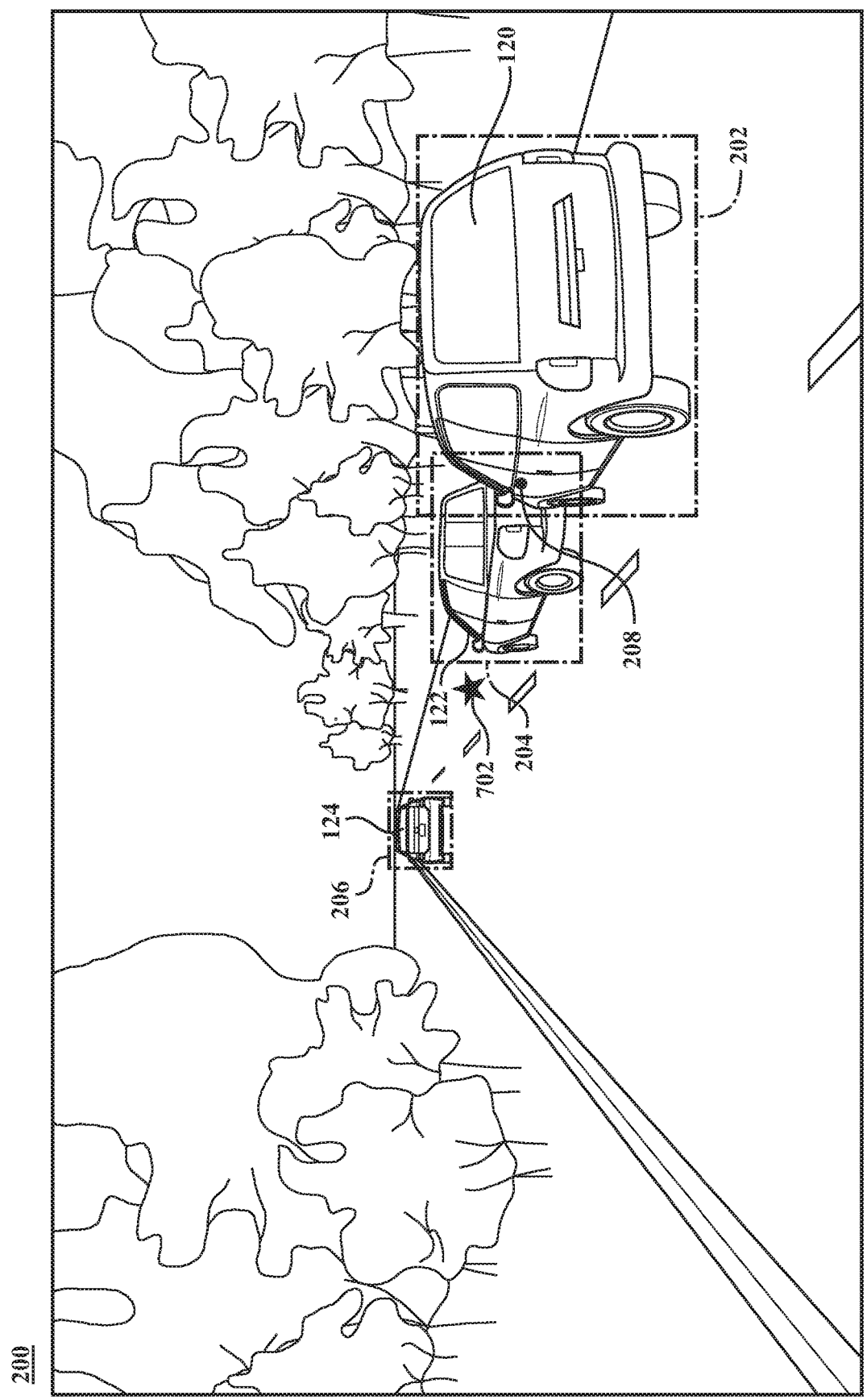
FIG. 7 is a diagram that includes an example of the two-dimensional image of objects in which a symbol is caused to appear in a vicinity of the specific object, according to the disclosed technologies.

Returning to FIG. 3, the communications module 312 can include instructions that function to control the processor 304 to cause, based on a location of a specific bounding box (e.g., the second bounding box 204 illustrated in FIG. 2) that encloses the point (e.g., the point 208 illustrated in FIG. 2), an indication of the specific object (e.g., the second object 122 (e.g., the second other vehicle) illustrated in FIGS. 1 and 2) to be presented. For example, the indication of the specific object can be displayed on a dashboard display (e.g., the dashboard display 114 illustrated in FIG. 1) or a heads-up display (e.g., the heads-up display 116 illustrated in FIG. 1). For example, the specific object can be presented in a manner that distinguishes the specific object from another of the objects. For example, FIG. 5 is a diagram that includes an example of the two-dimensional image 200 of objects in which the specific object (e.g., the second object 122 (e.g., the second other vehicle)) is highlighted, according to the disclosed technologies. Returning to FIG. 3, additionally or alternatively, for example, the specific bounding box can be presented in a manner that distinguishes the specific bounding box from another of the bounding boxes. For example, FIG. 6 is a diagram that includes an example of the two-dimensional image 200 of objects in which the specific bounding box (e.g., the second bounding box 204) is highlighted, according to the disclosed technologies. Returning to FIG. 3, additionally or alternatively, for example, a symbol can be caused to appear in the two-dimensional image 302 (e.g., the two-dimensional image 200 illustrated in FIG. 2) in a vicinity of the specific object. For example, FIG. 7 is a diagram that includes an example of the two-dimensional image 200 of objects in which a symbol 702 (e.g., a star) is caused to appear in a vicinity of the specific object (e.g., the second object 122 (e.g., the second other vehicle)), according to the disclosed technologies.

Returning to FIG. 3, additionally, the communications module 312 can include instructions that function to control the processor 304 to receive, from a source separate from the vehicle, additional information associated with the specific object (e.g., the second object 122 illustrated in FIGS. 1 and 2). For example, the source separate from the vehicle can include a cloud platform (e.g., the connected car cloud platform 126 illustrated in FIG. 1). For example, the cloud platform can store a digital twin of the specific object. Additionally or alternatively, the source separate from the vehicle can include the specific object. For example, the specific object can include another vehicle (e.g., the second other vehicle illustrated in FIGS. 1 and 2).

Additionally, the communications module 312 can include instructions that function to control the processor 304 to cause the additional information to be presented. For example, the additional information can be presented one or more of visually (e.g., via the dashboard display 114 or the heads-up display 116 illustrated in FIG. 1) or audibly (e.g., via the speaker 118 illustrated in FIG. 1). For example, if the specific object (e.g., the second object 122 illustrated in FIGS. 1 and 2) includes another vehicle (e.g., the second other vehicle illustrated in FIGS. 1 and 2), then the additional information can include one or more of information about the other vehicle or information about an operator of the other vehicle. For example, the digital twin of the other vehicle can include information about states and properties of the other vehicle, a position of the other vehicle, an indication that the other vehicle is in motion, information about maintenance and repairs performed on the other vehicle, or the like. For example, the vehicle (e.g., the vehicle 102 illustrated in FIG. 1) can include a biometric system (not illustrated) configured to determine an identity of an operator of the vehicle. For example, the biometric system can be a fingerprint scanner embedded in a steering wheel of the vehicle, an iris recognition device incorporated into a rearview mirror of the vehicle, or the like. For example, the cloud platform (e.g., the connected car cloud platform 126 illustrated in FIG. 1) can store a profile of the operator of the other vehicle. For example, the profile can include information about when the operator operates the other vehicle, a distance traveled by the operator, an amount of time that the operator has spent operating the other vehicle, an indication of a typical speed of the other vehicle when operated by the operator, an indication of a braking pattern of the operator, an indication of instances in which an operation of the other vehicle by the operator has caused an activation of a forward collision warning, an indication of instances in which an operation of the other vehicle by the operator has caused an activation of automatic emergency braking, or the like.

With reference to FIG. 1, for example, an operator of the vehicle 102 may be stuck in traffic behind the first object 120 (e.g., the first other vehicle) and the second object 122 (e.g., the second other vehicle). The operator of the vehicle 102 may be considering whether or not to pass the first object 120 (e.g., the first other vehicle) and the second object 122 (e.g., the second other vehicle) and may be assessing a risk of a passing maneuver in light of a presence of the third object 124 (e.g., the third other vehicle), which is oncoming. The additional information about the second object 122, the operator of the second object 122, or both may be presented visually (e.g., via the dashboard display 114 or the heads-up display 116), audibly (e.g., via the speaker 118), or both. The additional information may include that: (1) the second object 122 has an age of 20 years, (2) brakes of the second object 122 are in need of repair, (3) six hours have passed since the second object 122 has been at a speed of zero miles per hour, (4) the operator of the second object 122 has an age of 90 years, and (5) in the last six months of operations of the second object 122 by the operator of the second object 122, there have been three instances in which a forward collision warning has been caused to be activated.

Returning to FIG. 3, the image processing module 314 can include instructions that function to control the processor 304 to cause the point (e.g., the point 208 illustrated in FIG. 2) to appear in the two-dimensional image 302 (e.g., the two-dimensional image 200 illustrated in FIG. 2).

For example, the instructions of the image processing module 314 that function to control the processor 304 to cause the point (e.g., the point 208 illustrated in FIG. 2) to appear in the two-dimensional image 302 (e.g., the two-dimensional image 200 illustrated in FIG. 2) can receive, from a source separate from the vehicle, information related to the point. For example, the source separate from the vehicle can include a cloud platform (e.g., the connected car cloud platform 126 illustrated in FIG. 1). For example, the cloud platform can store a digital twin of the specific object (e.g., the second object 122 (e.g., the second other vehicle) illustrated in FIGS. 1 and 2). Additionally or alternatively, the source separate from the vehicle can include the specific object.

For example, the information related to the point can include information to transform a position, in the three-dimensional space, of the specific object to point caused to appear in the two-dimensional image 302. For example: (1) $P_w$ can represent the position, in the three-dimensional space, of the specific object (e.g., the position in a global navigation satellite system (GNSS)), $P_c$ can represent the position of the specific object in a reference frame of a camera that produced the two-dimensional image 302 (e.g., the second camera 112 illustrated in FIG. 1), (3) R can represent a rotation matrix (e.g., 3×3) that aligns axes that define the reference frame of the camera that produced the two-dimensional image 302 with a reference frame of a system that determined the position, in the three-dimensional space, of the specific object, and (4) t can represent a translation vector between an origin position of the reference frame of the camera that produced the two-dimensional image 302 and the reference frame of the system that determined the position, in the three-dimensional space, of the specific object. Based on these parameters:

$$P_w = RtP_c.$$

For example: (1) ($u_0$, $v_0$) can be coordinates of a principal point in the two-dimensional image 302, (2) $d_x$, $d_y$ can be a physical size of pixels in the two-dimensional image 302, (3) f can be a focal length of the camera that produced the two-dimensional image 302, (4) $Z_c$ can be a distance on an optic axis between the camera that produced the two-dimensional image 302 and an object that is included in the two-dimensional image 302, and (5) $M_i$ can be a matrix of intrinsic parameters of the camera that produced the two-dimensional image 302. Based on these parameters:

$$M_i = \begin{bmatrix} Z_c d_x / f & 0 & -Z_c d_x u_0 / f \\ 0 & Z_c d_y / f & -Z_c d_y v_0 / f \\ 0 & 0 & Z_c \end{bmatrix}.$$

$P_i$ can represent the coordinates of the point caused to appear in the two-dimensional image 302 (e.g., the point 208 illustrated in FIG. 2). Based on these parameters:

$$P_i = M_i^{-1} P_c.$$

For example, the instructions of the image processing module 314 that function to control the processor 304 to cause the point (e.g., the point 208 illustrated in FIG. 2) to appear in the two-dimensional image 302 (e.g., the two-dimensional image 200 illustrated in FIG. 2) can receive information about a position, in the three-dimensional space, of the vehicle (e.g., the vehicle 102 illustrated in FIG. 1). For example, the information about the position of the vehicle can be received from an inertial measurement unit (IMU). For example, the information about the position of the vehicle can be received from a source separate from the vehicle. For example, the source separate from the vehicle can include a global navigation satellite system (GNSS) or a global positioning system (GPS) (not illustrated). For example, the instructions of the image processing module 314 that function to control the processor 304 to cause the point to appear in the two-dimensional image 302 can receive information about a second camera (e.g., the second camera 112 illustrated in FIG. 1) that produced the two-dimensional image 302. For example, the information about the second camera that produced the two-dimensional image 302 can include one or more of an extrinsic parameter of the second camera or an intrinsic parameter of the second camera. For example, the extrinsic parameter can include one or more of a position of a camera center, a position of an origin in a world coordinate system, or a rotation matrix. For example, the intrinsic parameter can include one or more of a focal length, an image sensor format, a principal point, a skew coefficient, or lens distortion. For example, the instructions of the image processing module 314 that function to control the processor 304 to cause the point to appear in the two-dimensional image 302 can determine, based on the information related to the point, the information about the position of the vehicle, and the information about the second camera, the location of the point in the two-dimensional image 302.

Alternatively, a single camera (e.g., a stereo camera) can produce both the two-dimensional image 302 (e.g., the two-dimensional image 200) and the depth image 310 (e.g., the depth image 400).

The identification module 316 can include instructions that function to control the processor 304 to determine, in response to the existence of the condition and based on information included in the depth image 310 (e.g., the depth image 400 illustrated in FIG. 4) and a location of the point (e.g., the point 208 illustrated in FIG. 2) in the two-dimensional image 302 (e.g., the two-dimensional image 200 illustrated in FIG. 2), the specific bounding box (e.g., the second bounding box 204 illustrated in FIG. 2) that encloses the point. Additionally, the identification module 316 can include instructions that function to control the processor 304 to determine, in response to a lack of the existence of the condition and based on the location of the point in the two-dimensional image 302, the specific bounding box that encloses the point. In this manner, the disclosed technologies can efficiently identify the specific object in the two-dimensional image 302 by refraining from receiving the depth image 310 in a situation in which the information in the depth image 310 is not necessary to identify the specific object in the two-dimensional image 302.

For example, the instructions of the identification module 316 that function to control the processor 304 to determine the specific bounding box (e.g., the second bounding box 204 illustrated in FIG. 2) that encloses the point (e.g., the point 208 illustrated in FIG. 2) can include instructions that function to control the processor 304 to determine, from the depth image 310 (e.g., the depth image 400 illustrated in FIG. 4), a first distance. The first distance can be between a camera that produced the depth image 310 (e.g., the first camera 110 illustrated in FIG. 1) and a first bounding box (e.g., the second bounding box 204 illustrated in FIG. 2) of the plurality of the bounding boxes (e.g., the first bounding box 202 and the second bounding box 204 illustrated in FIG. 2) that enclose the point. For example, the instructions of the identification module 316 that function to control the processor 304 to determine the specific bounding box that encloses the point can include instructions that function to control the processor 304 to determine, from the depth image 310, a second distance. The second distance can be between the camera that produced the depth image 310 and a second bounding box (e.g., the first bounding box 202 illustrated in FIG. 2) of the plurality of the bounding boxes that enclose the point. For example, the instructions of the identification module 316 that function to control the processor 304 to determine the specific bounding box that encloses the point can include instructions that function to control the processor 304 to determine a third distance. The third distance can be between the camera that produced the depth image and the position, in the three-dimensional space, of the specific object (e.g., the second object 122 (e.g., the second other vehicle) illustrated in FIGS. 1 and 2). For example, the instructions of the identification module 316 that function to control the processor 304 to determine the specific bounding box that encloses the point can include instructions that function to control the processor 304 to determine that a first difference is less than a second difference. The first difference can be between the first distance and the third distance. The second difference can be between the second distance and the third distance.

Figure 8:
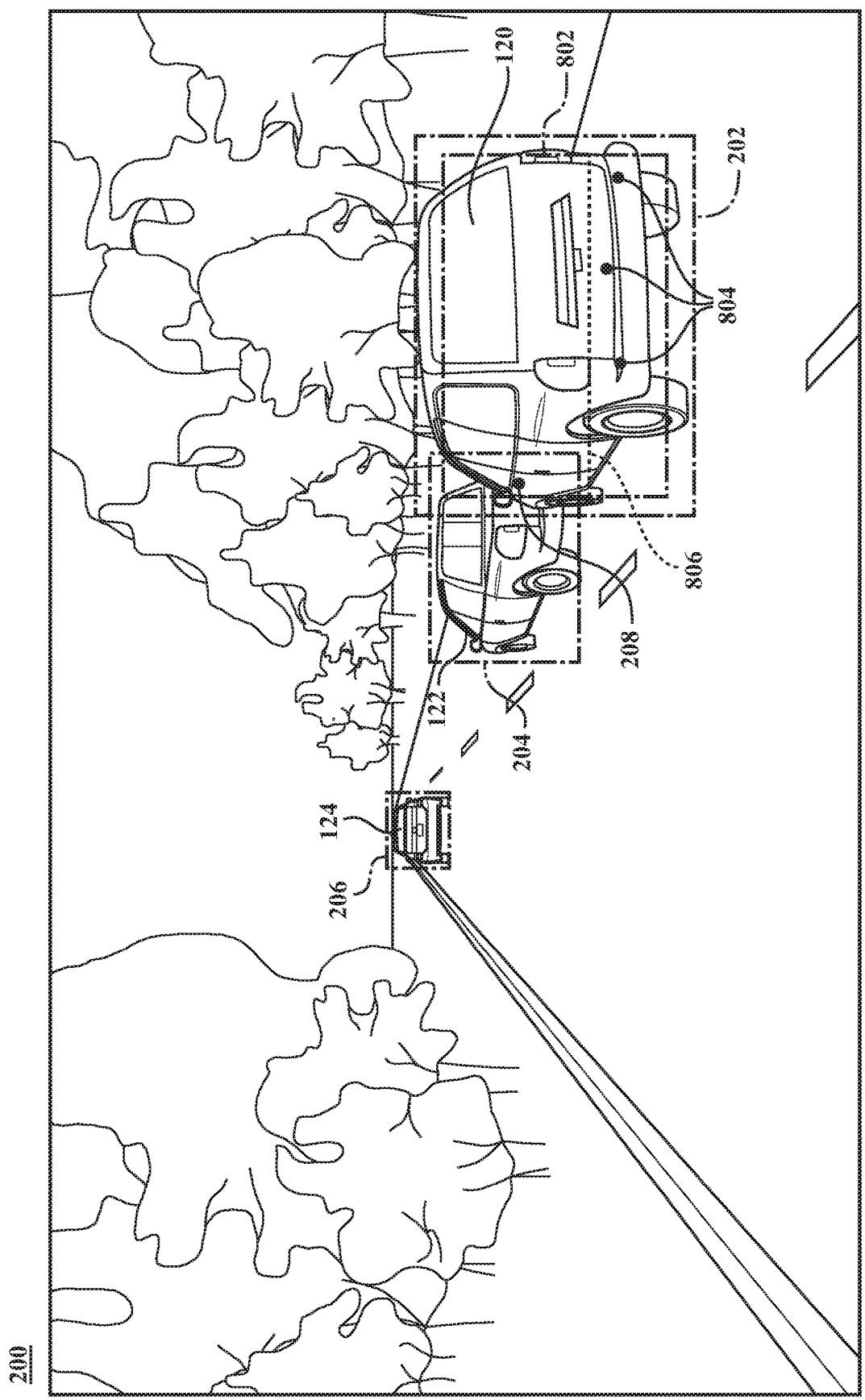
FIG. 8 is a diagram that includes an example of the two-dimensional image of objects in which a reduced-size bounding box has been produced by reducing a size of a bounding box by a threshold amount, according to the disclosed technologies FIG. 9 includes a flow diagram that illustrates an example of a method that is associated with identifying a specific object in a two-dimensional image of objects, according to the disclosed technologies.

For example, the instructions of the identification module 316 that function to control the processor 304 to determine the second distance can include instructions that function to control the processor 304 to reduce a size of the second bounding box (e.g., the first bounding box 202 illustrated in FIG. 2) by a threshold amount to produce a reduced-size bounding box. For example, FIG. 8 is a diagram that includes an example of the two-dimensional image 200 of objects in which a reduced-size bounding box 802 has been produced by reducing a size of the first bounding box 202 by a threshold amount, according to the disclosed technologies. Returning to FIG. 3, for example, the instructions of the identification module 316 that function to control the processor 304 to determine the second distance can include instructions that function to control the processor 304 to select a plurality of random points from a specific area of the reduced-size bounding box. For example, the specific area can be an area at a bottom of the reduced-size bounding box that has a size of about a quarter of an area of the reduced-size bounding box. With reference to FIG. 8, for example, the two-dimensional image 200 of objects can include a plurality of random points 804 from a specific area 806 of the reduced-size bounding box 802. Returning to FIG. 3, for example, the instructions of the identification module 316 that function to control the processor 304 to determine the second distance can include instructions that function to control the processor 304 to determine, for each random point of the plurality of random points, a distance between the camera that produced the depth image 310 (e.g., the first camera 110 illustrated in FIG. 1) and a random point of the plurality of random points to produce a set of distances. For example, the instructions of the identification module 316 that function to control the processor 304 to determine the second distance can include instructions that function to control the processor 304 to calculate an average distance of the set of distances.

Figure 9:
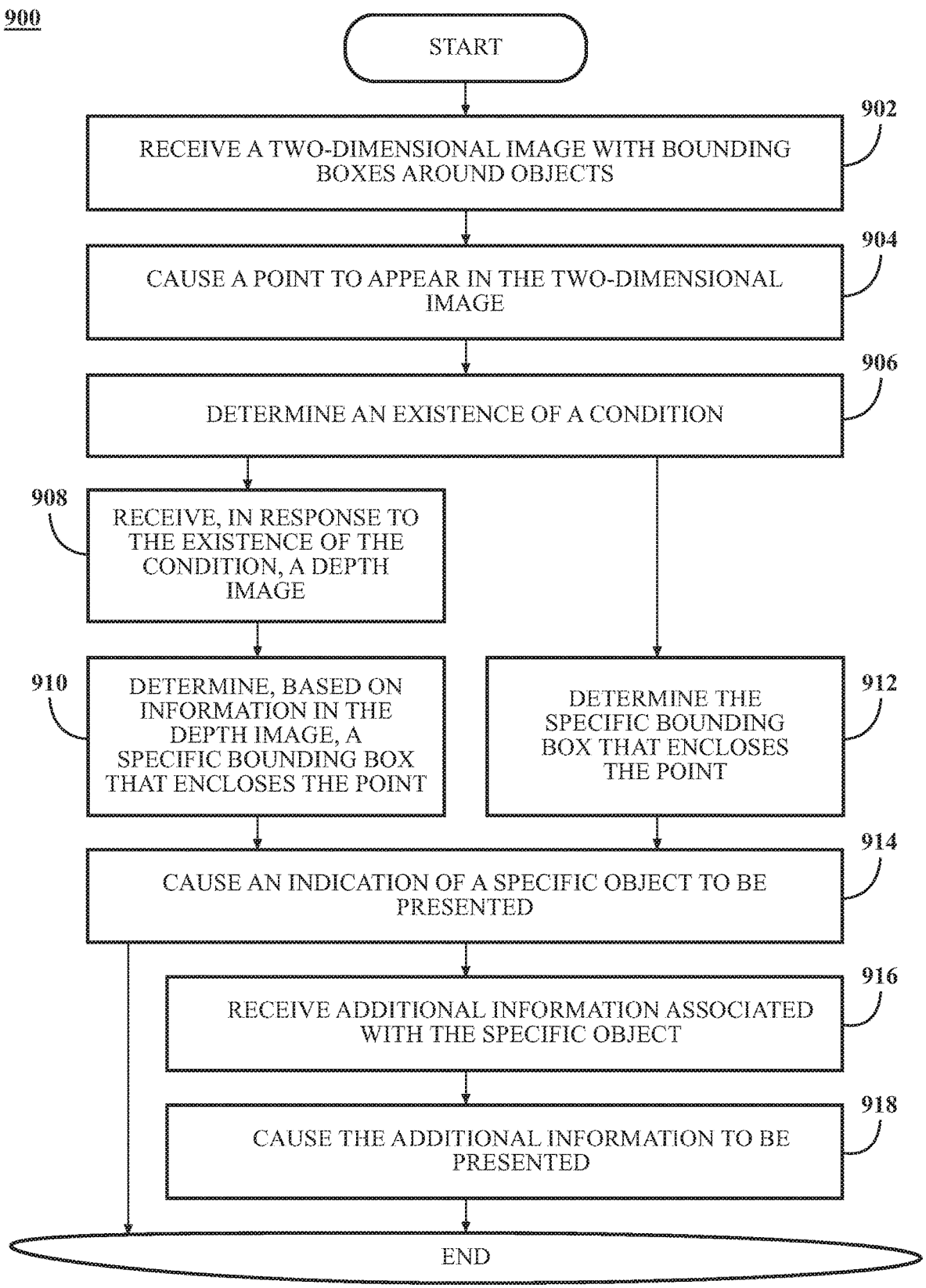

FIG. 9 includes a flow diagram that illustrates an example of a method 900 that is associated with identifying a specific object in a two-dimensional image of objects, according to the disclosed technologies. The method 900 is described from the perspective of the system 300 illustrated in FIG. 3. Although the method 900 is described in combination with the system 300, one of skill in the art understands, in light of the description herein, that the method 900 is not limited to being implemented by the system 300. Rather, the system 300 is an example of a system that may be used to implement the method 900.

In FIG. 9, in the method 900, at an operation 902, the processor 304, disposed in a vehicle (e.g., the vehicle 102 illustrated in FIG. 1), can receive the two-dimensional image 302 with bounding boxes around the objects. The two-dimensional image 302 can be stored in the data store 306. For example, the processor 304 can receive, from a neural network, the two-dimensional image 302 with bounding boxes around the objects.

At an operation 904, the processor 304 can cause a point to appear in the two-dimensional image 302. The point can represent a position, in a three-dimensional space, of the specific object.

For example, the processor 304 can receive, from a source separate from the vehicle, information related to the point. For example, the source separate from the vehicle can include a cloud platform.

For example, the processor 304 can receive information about a position, in the three-dimensional space, of the vehicle. For example, the information about the position of the vehicle from a source separate from the vehicle. For example, the source separate from the vehicle can include a global navigation satellite system (GNSS).

For example, the processor 304 can receive information about a first camera that produced the two-dimensional image 302. For example, the information about the first camera that produced the two-dimensional image 302 can include one or more of an extrinsic parameter of the first camera or an intrinsic parameter of the first camera.

For example, the processor 304 can determine, based on the information related to the point, the information about the position of the vehicle, and the information about the first camera, the location of the point in the two-dimensional image 302.

At an operation 906, the processor 304 can determine an existence of a condition. The condition can be that the point is enclosed by a plurality of the bounding boxes.

At an operation 908, the processor 304 can receive, in response to the existence of the condition, the depth image 310. The depth image 310 can be stored in the data store 306. For example, the processor 304 can receive the depth image 310 from a second camera. For example, the second camera can be the first camera.

At an operation 910, the processor 304 can determine, in response to the existence of the condition and based on information included in the depth image 310 and a location of the point in the two-dimensional image 302, a specific bounding box that encloses the point.

Figure 10:
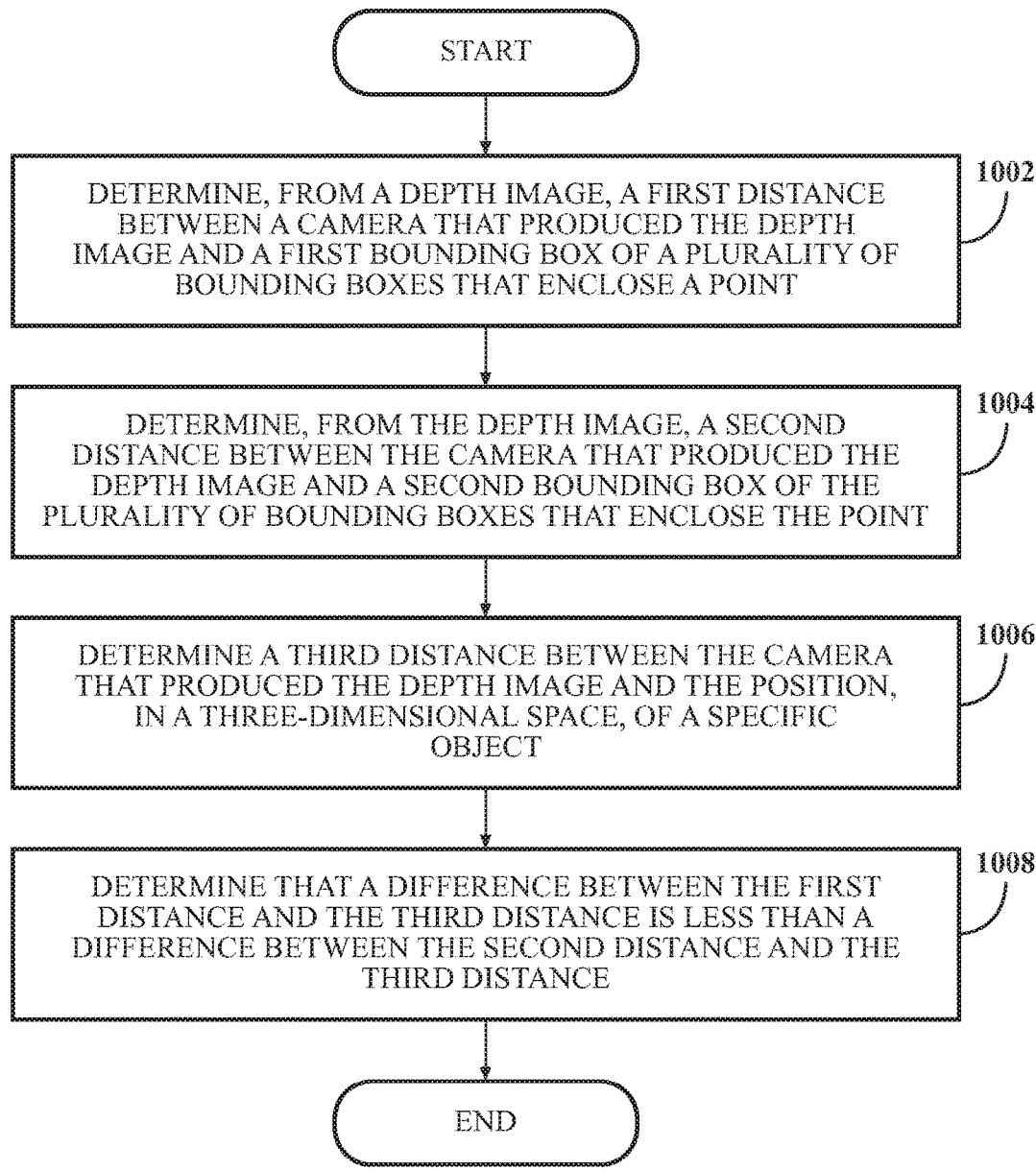
FIG. 10 includes a flow diagram that illustrates an example of a method that is associated with determining a specific bounding box that encloses a point, according to the disclosed technologies.

For example, FIG. 10 includes a flow diagram that illustrates an example of a method 910 that is associated with determining the specific bounding box that encloses the point, according to the disclosed technologies.

In the method 910, at an operation 1002, the processor 304 can determine, from the depth image 310, a first distance. The first distance can be between a camera that produced the depth image 310 and a first bounding box of the plurality of the bounding boxes that enclose the point.

Figure 11:
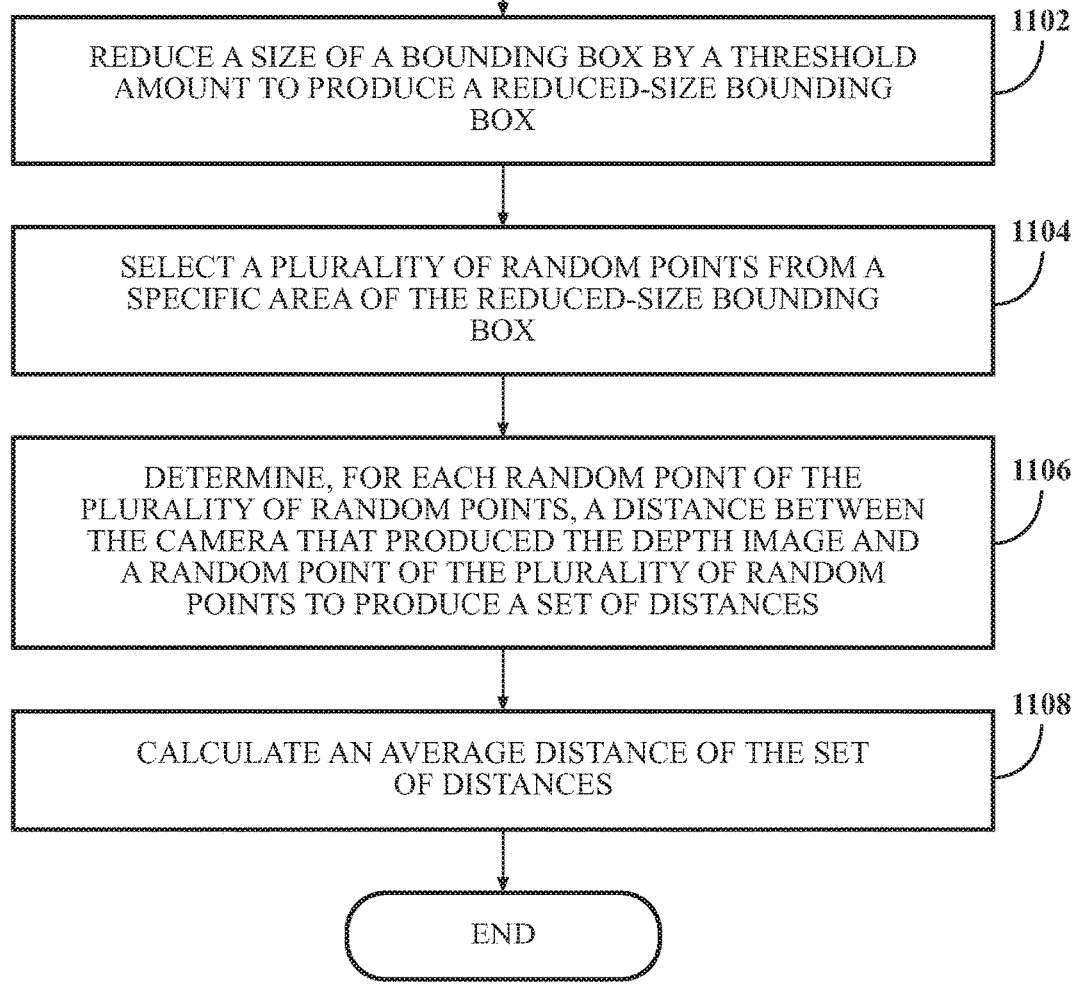
FIG. 11 includes a flow diagram that illustrates an example of a method that is associated with determining a distance, according to the disclosed technologies.

For example, FIG. 11 includes a flow diagram that illustrates an example of a method 1002 that is associated with determining the first distance, according to the disclosed technologies.

In the method 1002, at an operation 1102, the processor 304 can reduce a size of the first bounding box by a threshold amount to produce a reduced-size bounding box.

At an operation 1104, the processor 304 can select a plurality of random points from a specific area of the reduced-size bounding box.

At an operation 1106, the processor 304 can determine, for each random point of the plurality of random points, a distance between the camera that produced the depth image and a random point of the plurality of random points to produce a set of distances.

At an operation 1108, the processor 304 can calculate an average distance of the set of distances.

Returning to FIG. 10, in the method 910, at an operation 1004, the processor 304 can determine, from the depth image 310, a second distance. The second distance can be between the camera that produced the depth image 310 and a second bounding box of the plurality of the bounding boxes that enclose the point.

At an operation 1006, the processor 304 can determine a third distance. The third distance can be between the camera that produced the depth image 310 and the position, in the three-dimensional space, of the specific object.

At an operation 1008, the processor 304 can determine that a first difference is less than a second difference. The first difference can be between the first distance and the third distance. The second difference can be between the second distance and the third distance.

Returning to FIG. 9, in the method 900, in a first implementation, at an operation 912, the processor 304 can determine, in response to a lack of the existence of the condition and based on the location of the point in the two-dimensional image 302, the specific bounding box that encloses the point.

At an operation 914, the processor 304 can cause, based on a location of the specific bounding box, an indication of the specific object to be presented. For example, the processor 304 can cause the indication of the specific object to be presented on one or more of a dashboard display or a heads-up display. For example, the processor 304 can cause the specific object to be presented in a manner that distinguishes the specific object from another of the objects. For example, the processor 304 can cause the specific bounding box to be presented in a manner that distinguishes the specific bounding box from another of the bounding boxes. For example, the processor 304 can cause a symbol to appear in the two-dimensional image 302 in a vicinity of the specific object.

Additionally, in a second implementation, at an operation 916, the processor 304 can receive, from a source separate from the vehicle, additional information associated with the specific object. For example, the source separate from the vehicle can include a cloud platform. For example, the specific object can include another vehicle.

In the second implementation, at an operation 918, the processor 304 can cause the additional information to be presented. For example, the additional information can include one or more of information about the other vehicle or information about an operator of the other vehicle. For example, the processor 304 can cause the additional information to be presented one or more of visually or audibly.

A simulation of the disclosed technologies that used a real-world, multi-lane highway scenario reduced speed variance from 16.6 to 14.1. Generally, a reduction in speed variance is associated with a reduction in collisions. Additionally, results of the simulation included an increase in an average time to collision (TTC) from 1.2 seconds to 3.2 seconds.

Figure 12:
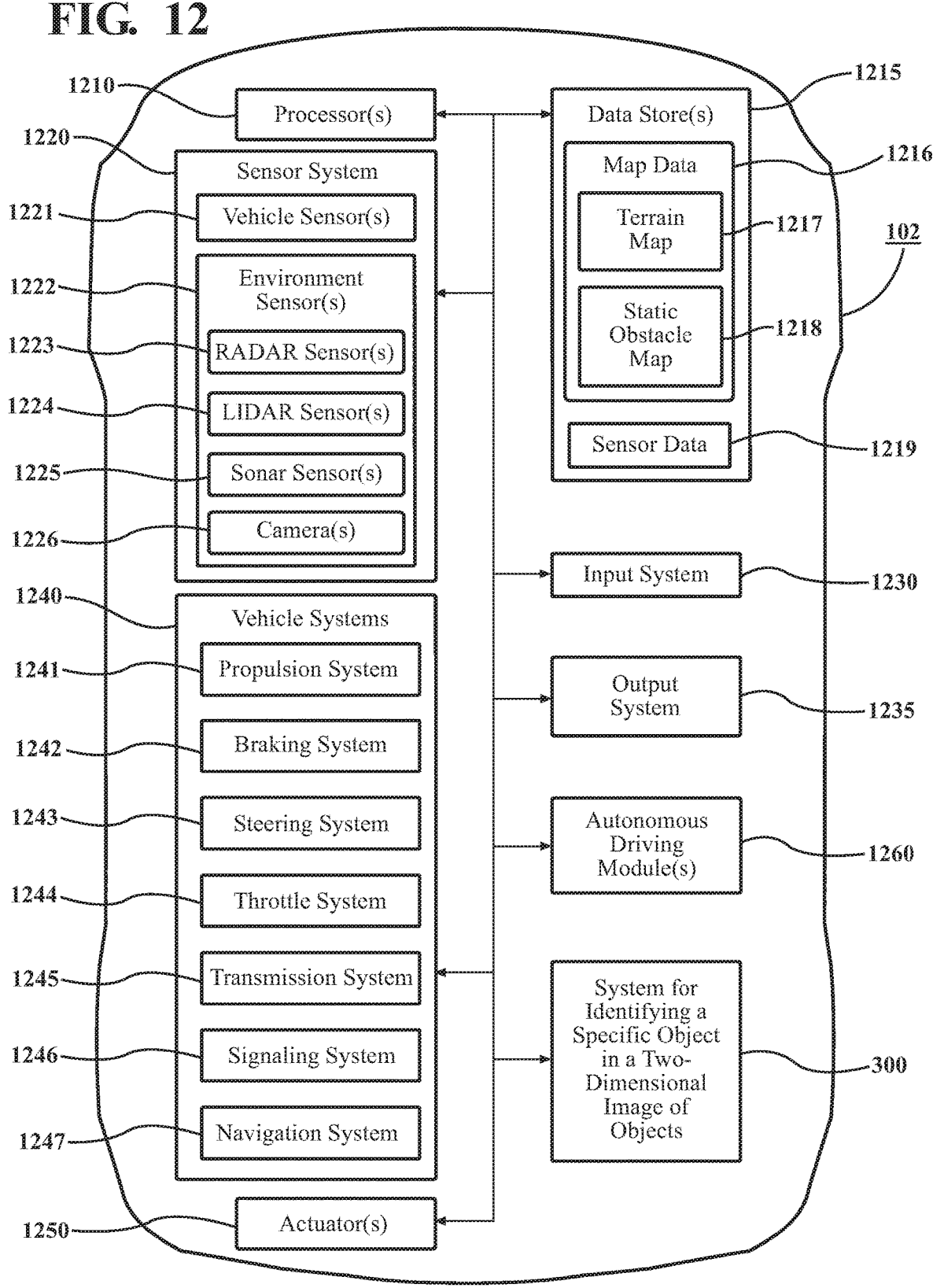
FIG. 12 includes a block diagram that illustrates an example of elements disposed on a vehicle, according to the disclosed technologies.

FIG. 12 includes a block diagram that illustrates an example of elements disposed on the vehicle 102, according to the disclosed technologies. As used herein, a "vehicle" can be any form of powered transport. In one or more implementations, the vehicle 102 can be an automobile. While arrangements described herein are with respect to automobiles, one of skill in the art understands, in light of the description herein, that embodiments are not limited to automobiles.

In some embodiments, the vehicle 102 can be configured to switch selectively between an autonomous mode, one or more semi-autonomous operational modes, and/or a manual mode. Such switching can be implemented in a suitable manner, now known or later developed. As used herein, "manual mode" can refer that all of or a majority of the navigation and/or maneuvering of the vehicle 102 is performed according to inputs received from a user (e.g., human driver). In one or more arrangements, the vehicle 102 can be a conventional vehicle that is configured to operate in only a manual mode.

In one or more embodiments, the vehicle 102 can be an autonomous vehicle. As used herein, "autonomous vehicle" can refer to a vehicle that operates in an autonomous mode. As used herein, "autonomous mode" can refer to navigating and/or maneuvering the vehicle 102 along a travel route using one or more computing systems to control the vehicle 102 with minimal or no input from a human driver. In one or more embodiments, the vehicle 102 can be highly automated or completely automated. In one embodiment, the vehicle 102 can be configured with one or more semi-autonomous operational modes in which one or more computing systems perform a portion of the navigation and/or maneuvering of the vehicle along a travel route, and a vehicle operator (i.e., driver) provides inputs to the vehicle 102 to perform a portion of the navigation and/or maneuvering of the vehicle 102 along a travel route.

The vehicle 102 can include various elements. The vehicle 102 can have any combination of the various elements illustrated in FIG. 12. In various embodiments, it may not be necessary for the vehicle 102 to include all of the elements illustrated in FIG. 12. Furthermore, the vehicle 102 can have elements in addition to those illustrated in FIG. 12. While the various elements are illustrated in FIG. 12 as being located within the vehicle 102, one or more of these elements can be located external to the vehicle 102. Furthermore, the elements illustrated may be physically separated by large distances. For example, as described, one or more components of the disclosed system can be implemented within the vehicle 102 while other components of the system can be implemented within a cloud-computing environment, as described below. For example, the elements can include one or more processors 1210, one or more data stores 1215, a sensor system 1220, an input system 1230, an output system 1235, vehicle systems 1240, one or more actuators 1250, one or more autonomous driving modules 1260, and the system 300 for distinguishing, in an image represented by a point cloud data set, a first object from a second object.

In one or more arrangements, the one or more processors 1210 can be a main processor of the vehicle 102. For example, the one or more processors 1210 can be an electronic control unit (ECU). For example, functions and/or operations of the processor 304 (illustrated in FIG. 3) can be realized by the one or more processors 1210.

The one or more data stores 1215 can store, for example, one or more types of data. For example, functions and/or operations of the data store 306 and/or the memory 308 (illustrated in FIG. 3) can be realized by the one or more data stores 1215. The one or more data store 1215 can include volatile memory and/or non-volatile memory. Examples of suitable memory for the one or more data stores 1215 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 1215 can be a component of the one or more processors 1210. Additionally or alternatively, the one or more data stores 1215 can be operatively connected to the one or more processors 1210 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 1215 can store map data 1216. The map data 1216 can include maps of one or more geographic areas. In some instances, the map data 1216 can include information or data on roads, traffic control devices, road markings, structures, features, and/or landmarks in the one or more geographic areas. The map data 1216 can be in any suitable form. In some instances, the map data 1216 can include aerial views of an area. In some instances, the map data 1216 can include ground views of an area, including 360-degree ground views. The map data 1216 can include measurements, dimensions, distances, and/or information for one or more items included in the map data 1216 and/or relative to other items included in the map data 1216. The map data 1216 can include a digital map with information about road geometry. The map data 1216 can be high quality and/or highly detailed.

In one or more arrangements, the map data 1216 can include one or more terrain maps 1217. The one or more terrain maps 1217 can include information about the ground, terrain, roads, surfaces, and/or other features of one or more geographic areas. The one or more terrain maps 1217 can include elevation data of the one or more geographic areas. The map data 1216 can be high quality and/or highly detailed. The one or more terrain maps 1217 can define one or more ground surfaces, which can include paved roads, unpaved roads, land, and other things that define a ground surface.

In one or more arrangements, the map data 1216 can include one or more static obstacle maps 1218. The one or more static obstacle maps 1218 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 1218 can have location data, size data, dimension data, material data, and/or other data associated with them. The one or more static obstacle maps 1218 can include measurements, dimensions, distances, and/or information for one or more static obstacles. The one or more static obstacle maps 1218 can be high quality and/or highly detailed. The one or more static obstacle maps 1218 can be updated to reflect changes within a mapped area.

In one or more arrangements, the one or more data stores 1215 can store sensor data 1219. As used herein, "sensor data" can refer to any information about the sensors with which the vehicle 102 can be equipped including the capabilities of and other information about such sensors. The sensor data 1219 can relate to one or more sensors of the sensor system 1220. For example, in one or more arrangements, the sensor data 1219 can include information about one or more lidar sensors 1224 of the sensor system 1220.

In some arrangements, at least a portion of the map data 1216 and/or the sensor data 1219 can be located in one or more data stores 1215 that are located onboard the vehicle 102. Alternatively or additionally, at least a portion of the map data 1216 and/or the sensor data 1219 can be located in one or more data stores 1215 that are located remotely from the vehicle 102.

The sensor system 1220 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 1220 includes a plurality of sensors, the sensors can work independently from each other. Alternatively, two or more of the sensors can work in combination with each other. In such a case, the two or more sensors can form a sensor network. The sensor system 1220 and/or the one or more sensors can be operatively connected to the one or more processors 1210, the one or more data stores 1215, and/or another element of the vehicle 102 (including any of the elements illustrated in FIG. 12). The sensor system 1220 can acquire data of at least a portion of the external environment of the vehicle 102 (e.g., nearby vehicles). The sensor system 1220 can include any suitable type of sensor. Various examples of different types of sensors are described herein. However, one of skill in the art understands that the embodiments are not limited to the particular sensors described herein.

The sensor system 1220 can include one or more vehicle sensors 1221. The one or more vehicle sensors 1221 can detect, determine, and/or sense information about the vehicle 102 itself. In one or more arrangements, the one or more vehicle sensors 1221 can be configured to detect and/or sense position and orientation changes of the vehicle 102 such as, for example, based on inertial acceleration. In one or more arrangements, the one or more vehicle sensors 1221 can include one or more accelerometers, one or more gyroscopes, an inertial measurement unit (IMU), a dead-reckoning system, a global navigation satellite system (GNSS), a global positioning system (GPS), a navigation system 1247, and/or other suitable sensors. The one or more vehicle sensors 1221 can be configured to detect and/or sense one or more characteristics of the vehicle 102. In one or more arrangements, the one or more vehicle sensors 1221 can include a speedometer to determine a current speed of the vehicle 102.

Alternatively or additionally, the sensor system 1220 can include one or more environment sensors 1222 configured to acquire and/or sense driving environment data. As used herein, "driving environment data" can include data or information about the external environment in which a vehicle is located or one or more portions thereof. For example, the one or more environment sensors 1222 can be configured to detect, quantify, and/or sense obstacles in at least a portion of the external environment of the vehicle 102 and/or information/data about such obstacles. Such obstacles may be stationary objects and/or dynamic objects. The one or more environment sensors 1222 can be configured to detect, measure, quantify, and/or sense other things in the external environment of the vehicle 102 such as, for example, lane markers, signs, traffic lights, traffic signs, lane lines, crosswalks, curbs proximate the vehicle 102, off-road objects, etc.

Various examples of sensors of the sensor system 1220 are described herein. The example sensors may be part of the one or more vehicle sensors 1221 and/or the one or more environment sensors 1222. However, one of skill in the art understands that the embodiments are not limited to the particular sensors described.

In one or more arrangement, the one or more environment sensors 1222 can include one or more radar sensors 1223, one or more lidar sensors 1224, one or more sonar sensors 1225, and/or one or more cameras 1226. In one or more arrangements, the one or more cameras 1226 can be one or more high dynamic range (HDR) cameras or one or more infrared (IR) cameras. For example, the one or more cameras 1226 can be used to record a reality of a state of an item of information that can appear in digital map.

The input system 1230 can include any device, component, system, element, arrangement, or groups thereof that enable information/data to be entered into a machine. The input system 1230 can receive an input from a vehicle passenger (e.g., a driver or a passenger). The output system 1235 can include any device, component, system, element, arrangement, or groups thereof that enable information/data to be presented to a vehicle passenger (e.g., a driver or a passenger).

Various examples of the one or more vehicle systems 1240 are illustrated in FIG. 12. However, one of skill in the art understands that the vehicle 102 can include more, fewer, or different vehicle systems. Although particular vehicle systems can be separately defined, each or any of the systems or portions thereof may be otherwise combined or segregated via hardware and/or software within the vehicle 102. For example, the one or more vehicle systems 1240 can include a propulsion system 1241, a braking system 1242, a steering system 1243, a throttle system 1244, a transmission system 1245, a signaling system 1246, and/or the navigation system 1247. Each of these systems can include one or more devices, components, and/or a combination thereof, now known or later developed.

The navigation system 1247 can include one or more devices, applications, and/or combinations thereof, now known or later developed, configured to determine the geographic location of the vehicle 102 and/or to determine a travel route for the vehicle 102. The navigation system 1247 can include one or more mapping applications to determine a travel route for the vehicle 102. The navigation system 1247 can include a global positioning system, a local positioning system, a geolocation system, and/or a combination thereof.

The one or more actuators 1250 can be any element or combination of elements operable to modify, adjust, and/or alter one or more of the vehicle systems 1240 or components thereof responsive to receiving signals or other inputs from the one or more processors 1210 and/or the one or more autonomous driving modules 1260. Any suitable actuator can be used. For example, the one or more actuators 1250 can include motors, pneumatic actuators, hydraulic pistons, relays, solenoids, and/or piezoelectric actuators.

The one or more processors 1210 and/or the one or more autonomous driving modules 1260 can be operatively connected to communicate with the various vehicle systems 1240 and/or individual components thereof. For example, the one or more processors 1210 and/or the one or more autonomous driving modules 1260 can be in communication to send and/or receive information from the various vehicle systems 1240 to control the movement, speed, maneuvering, heading, direction, etc. of the vehicle 102. The one or more processors 1210 and/or the one or more autonomous driving modules 1260 may control some or all of these vehicle systems 1240 and, thus, may be partially or fully autonomous.

The one or more processors 1210 and/or the one or more autonomous driving modules 1260 may be operable to control the navigation and/or maneuvering of the vehicle 102 by controlling one or more of the vehicle systems 1240 and/or components thereof. For example, when operating in an autonomous mode, the one or more processors 1210 and/or the one or more autonomous driving modules 1260 can control the direction and/or speed of the vehicle 102. The one or more processors 1210 and/or the one or more autonomous driving modules 1260 can cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The vehicle 102 can include one or more modules, at least some of which are described herein. The modules can be implemented as computer-readable program code that, when executed by the one or more processors 1210, implement one or more of the various processes described herein. One or more of the modules can be a component of the one or more processors 1210. Alternatively or additionally, one or more of the modules can be executed on and/or distributed among other processing systems to which the one or more processors 1210 can be operatively connected. The modules can include instructions (e.g., program logic) executable by the one or more processors 1210. Alternatively or additionally, the one or more data store 1215 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 102 can include one or more autonomous driving modules 1260. The one or more autonomous driving modules 1260 can be configured to receive data from the sensor system 1220 and/or any other type of system capable of capturing information relating to the vehicle 102 and/or the external environment of the vehicle 102. In one or more arrangements, the one or more autonomous driving modules 1260 can use such data to generate one or more driving scene models. The one or more autonomous driving modules 1260 can determine position and velocity of the vehicle 102. The one or more autonomous driving modules 1260 can determine the location of obstacles, obstacles, or other environmental features including traffic signs, trees, shrubs, neighboring vehicles, pedestrians, etc.

The one or more autonomous driving modules 1260 can be configured to receive and/or determine location information for obstacles within the external environment of the vehicle 102 for use by the one or more processors 1210 and/or one or more of the modules described herein to estimate position and orientation of the vehicle 102, vehicle position in global coordinates based on signals from a plurality of satellites, or any other data and/or signals that could be used to determine the current state of the vehicle 102 or determine the position of the vehicle 102 with respect to its environment for use in either creating a map or determining the position of the vehicle 102 in respect to map data.

The one or more autonomous driving modules 1260 can be configured to determine one or more travel paths, current autonomous driving maneuvers for the vehicle 102, future autonomous driving maneuvers and/or modifications to current autonomous driving maneuvers based on data acquired by the sensor system 1220, driving scene models, and/or data from any other suitable source such as determinations from the sensor data 1219. As used herein, "driving maneuver" can refer to one or more actions that affect the movement of a vehicle. Examples of driving maneuvers include: accelerating, decelerating, braking, turning, moving in a lateral direction of the vehicle 102, changing travel lanes, merging into a travel lane, and/or reversing, just to name a few possibilities. The one or more autonomous driving modules 1260 can be configured to implement determined driving maneuvers. The one or more autonomous driving modules 1260 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The one or more autonomous driving modules 1260 can be configured to execute various vehicle functions and/or to transmit data to, receive data from, interact with, and/or control the vehicle 102 or one or more systems thereof (e.g., one or more of vehicle systems 1240). For example, functions and/or operations of an automotive navigation system can be realized by the one or more autonomous driving modules 1260.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 3, and 9-11, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures.

For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for identifying a specific object in a two-dimensional image of objects, the system comprising:
   one or more processors disposed in a vehicle;
   a data store communicably coupled to the one or more processors and storing the two-dimensional image and a depth image; and
   a memory communicably coupled to the one or more processors and storing:
      a communications module including instructions that when executed by the one or more processors cause the one or more processors to:
         receive the two-dimensional image with bounding boxes around the objects;
         receive, in response to an existence of a condition, the depth image, the condition being that a point is enclosed by a plurality of the bounding boxes, the point representing a position, in a three-dimensional space, of the specific object; and
         cause, based on a location of a specific bounding box that encloses the point, an indication of the specific object to be presented;
      an image processing module including instructions that when executed by the one or more processors cause the one or more processors to cause the point to appear in the two-dimensional image; and
      an identification module including instructions that when executed by the one or more processors cause the one or more processors to determine, in response to the existence of the condition and based on information included in the depth image and a location of the point in the two-dimensional image, the specific bounding box that encloses the point.

2. The system of claim 1, wherein the identification module further includes instructions that when executed by the one or more processors cause the one or more processors to determine, in response to a lack of the existence of the condition and based on the location of the point in the two-dimensional image, the specific bounding box that encloses the point.

3. The system of claim 1, wherein the instructions of the communications module when executed by the one or more processors cause the one or more processors to receive, from a neural network, the two-dimensional image with the bounding boxes around the objects.

4. The system of claim 1, wherein the instructions of the image processing module when executed by the one or more processors cause the one or more processors to receive, from a source separate from the vehicle, information related to the point.

5. The system of claim 4, wherein the source separate from the vehicle comprises a cloud platform, the cloud platform storing a digital twin of the specific object.

6. The system of claim 4, wherein the instructions of the image processing module when executed by the one or more processors cause the one or more processors to:
receive information about a position, in the three-dimensional space, of the vehicle;
receive information about a first camera that produced the two-dimensional image; and
determine, based on the information related to the point, the information about the position of the vehicle, and the information about the first camera, the location of the point in the two-dimensional image.

7. The system of claim 6, wherein the instructions of the image processing module when executed by the one or more processors cause the one or more processors to receive the information about the position of the vehicle from another source separate from the vehicle.

8. The system of claim 7, wherein the other source separate from the vehicle comprises a global navigation satellite system.

9. The system of claim 6, wherein the information about the first camera that produced the two-dimensional image comprises at least one of an extrinsic parameter of the first camera or an intrinsic parameter of the first camera.

10. The system of claim 6, wherein the instructions of the communications module when executed by the one or more processors cause the one or more processors to receive the depth image from a second camera.

11. The system of claim 10, wherein the second camera is the first camera.

12. The system of claim 1, wherein the instructions of the communications module when executed by the one or more processors cause the one or more processors to at least one of:
cause the indication of the specific object to be presented on at least one of a dashboard display or a heads-up display,
cause the specific object to be presented in a manner that distinguishes the specific object from another of the objects,
cause the specific bounding box to be presented in a manner that distinguishes the specific bounding box from another of the bounding boxes, or
cause a symbol to appear in the two-dimensional image in a vicinity of the specific object.

13. The system of claim 1, wherein the communications module further includes instructions that when executed by the one or more processors cause the one or more processors to:
receive, from a source separate from the vehicle, additional information associated with the specific object; and
cause the additional information to be presented.

14. The system of claim 13, wherein the source separate from the vehicle comprises a cloud platform, the cloud platform storing a digital twin of the specific object.

15. The system of claim 13, wherein:
the specific object comprises another vehicle, and
the additional information comprises at least one of information about the other vehicle or information about an operator of the other vehicle.

16. The system of claim 13, wherein the instructions of the communications module when executed by the one or more processors cause the one or more processors to cause the additional information to be presented at least one of visually or audibly.

17. A method for identifying a specific object in a two-dimensional image of objects, the method comprising:
receiving, by a processor disposed in a vehicle, the two-dimensional image with bounding boxes around the objects;
causing, by the processor, a point to appear in the two-dimensional image, the point representing a position, in a three-dimensional space, of the specific object;
determining, by the processor, an existence of a condition, the condition being that the point is enclosed by a plurality of the bounding boxes;
receiving, by the processor and in response to the existence of the condition, a depth image;
determining, by the processor, in response to the existence of the condition, and based on information included in the depth image and a location of the point in the two-dimensional image, a specific bounding box that encloses the point; and
causing, by the processor and based on a location of the specific bounding box, an indication of the specific object to be presented.

18. The method of claim 17, wherein the determining the specific bounding box that encloses the point comprises:
determining, from the depth image, a first distance, the first distance being between a camera that produced the depth image and a first bounding box of the plurality of the bounding boxes that enclose the point;
determining, from the depth image, a second distance, the second distance being between the camera that produced the depth image and a second bounding box of the plurality of the bounding boxes that enclose the point;
determining a third distance, the third distance being between the camera that produced the depth image and the position, in the three-dimensional space, of the specific object; and
determining that a first difference is less than a second difference, the first difference being between the first distance and the third distance, the second difference being between the second distance and the third distance.

19. The method of claim 18, wherein the determining the second distance comprises:
reducing a size of the second bounding box by a threshold amount to produce a reduced-size bounding box;

selecting a plurality of random points from a specific area of the reduced-size bounding box;

determining, for each random point of the plurality of random points, a distance between the camera that produced the depth image and a random point of the plurality of random points to produce a set of distances; and calculating an average distance of the set of distances.

20. A non-transitory computer-readable medium for identifying a specific object in a two-dimensional image of objects, the non-transitory computer-readable medium including instructions that when executed by one or more processors, disposed in a vehicle, cause the one or more processors to:

receive the two-dimensional image with bounding boxes around the objects;

cause a point to appear in the two-dimensional image, the point representing a position, in a three-dimensional space, of the specific object;

determine an existence of a condition, the condition being that the point is enclosed by a plurality of the bounding boxes;

receive, in response to the existence of the condition, a depth image;

determine, in response to the existence of the condition and based on information included in the depth image and a location of the point in the two-dimensional image, a specific bounding box that encloses the point; and cause, based on a location of the specific bounding box, an indication of the specific object to be presented.

* * * * *